United States Patent
Wasalaski

(10) Patent No.: US 7,192,293 B2
(45) Date of Patent: Mar. 20, 2007

(54) NON-REVERSING SHORT TAPE COIL DEVICE

(75) Inventor: Philip L. Wasalaski, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/966,860

(22) Filed: Oct. 15, 2004

(65) Prior Publication Data

US 2006/0084306 A1    Apr. 20, 2006

(51) Int. Cl.
*H01R 3/00* (2006.01)

(52) U.S. Cl. ...................................... 439/164

(58) Field of Classification Search ............... 439/164, 439/15; 250/231.15; 191/12.2 R; 280/728.2
See application file for complete search history.

(56) References Cited

U.S. PATENT DOCUMENTS

| 1,366,552 A | 1/1921 | Blackburn |
| 1,480,656 A | 1/1924 | Blackburn |
| 1,922,493 A | 8/1933 | Murray |
| 2,106,925 A | 2/1938 | Hagler |
| 2,221,409 A | 11/1940 | Phelps et al. |
| 2,850,715 A | 9/1958 | Gurney |
| 3,001,034 A | 9/1961 | Aitken et al. |
| 3,258,727 A | 6/1966 | Casler |
| 3,426,308 A | 2/1969 | Andersen et al. |
| 3,525,536 A | 8/1970 | Pruneski et al. |
| 3,597,721 A | 8/1971 | Mangan |
| 3,649,946 A | 3/1972 | Frowein |
| 3,652,971 A | 3/1972 | Bugg |
| 3,657,491 A | 4/1972 | Ryder |
| 3,691,871 A | 9/1972 | Gladow et al. |
| 3,712,968 A | 1/1973 | Bonn et al. |
| 3,763,455 A | 10/1973 | Confer et al. |
| 3,768,824 A | 10/1973 | Kloppe et al. |
| 3,876,272 A | 4/1975 | Tsutsumi et al. |
| 3,959,608 A | 5/1976 | Pinlayson et al. |
| 4,063,789 A | 12/1977 | Kreisl |
| 4,157,854 A | 6/1979 | Beauch |
| 4,183,598 A | 1/1980 | Aarninkhof |
| 4,218,073 A | 8/1980 | Cymbal |
| 4,246,482 A | 1/1981 | Zupancic |
| 4,383,148 A | 5/1983 | Arima et al. |
| 4,417,775 A | 11/1983 | Sakurai et al. |
| 4,422,669 A | 12/1983 | Sakurai et al. |
| 4,451,105 A | 5/1984 | Sakurai |
| 4,502,746 A | 3/1985 | Wawra et al. |
| 4,540,223 A | 9/1985 | Schmerda |

(Continued)

*Primary Examiner*—Alexander Gilman
(74) *Attorney, Agent, or Firm*—Michael D. Smith

(57) ABSTRACT

The invention provides an apparatus including a housing and a spool disposed in the housing for rotation. The apparatus also includes a wire disposed in the housing and having a first end fixedly engaged with the housing and a second end fixedly engaged with the spool. The wire is moveable between a first configuration generally wound around the spool and a second configuration generally unwound with respect to the spool and arranged along an inner surface of the housing. The wire moves between the first and second configurations in response to relative rotation between the spool and the housing. The apparatus also includes at least one guide member disposed in the housing and movable along an arcuate path. The guide member moves in an opposite direction of rotation of the spool to guide movement of the wire between the spool and the housing.

22 Claims, 3 Drawing Sheets

U.S. PATENT DOCUMENTS

| | | | |
|---|---|---|---|
| 4,542,858 A | 9/1985 | Manges | |
| 4,547,636 A | 10/1985 | Mizuno et al. | |
| 4,572,313 A | 2/1986 | Ono et al. | |
| 4,607,898 A | 8/1986 | Reighard et al. | |
| 4,657,326 A | 4/1987 | Zeller et al. | |
| 4,696,523 A | 9/1987 | Schauer et al. | |
| 4,722,690 A | 2/1988 | Priede | |
| 4,735,573 A | 4/1988 | Zeller et al. | |
| 4,744,763 A | 5/1988 | Suzuki et al. | |
| 4,753,599 A | 6/1988 | Kokubu et al. | |
| 4,789,342 A | 12/1988 | Shitanoki | |
| 4,797,109 A | 1/1989 | Wende | |
| 4,813,878 A | 3/1989 | Schauer | |
| 4,824,396 A | 4/1989 | Sasaki et al. | |
| 4,836,795 A | 6/1989 | Schauer | |
| 4,838,803 A | 6/1989 | Kondo | |
| 4,844,359 A | 7/1989 | Kato | |
| 4,867,688 A | 9/1989 | Suzuki | |
| 4,875,860 A | 10/1989 | Suzuki | |
| 4,886,460 A | 12/1989 | Olgren | |
| 4,919,620 A | 4/1990 | Yamaguchi et al. | |
| 4,925,122 A | 5/1990 | Bannai | |
| 4,927,365 A | 5/1990 | Schauer et al. | |
| 4,928,901 A | 5/1990 | Bannai et al. | |
| 4,936,782 A | 6/1990 | Bannai et al. | |
| 4,975,063 A | 12/1990 | Ida et al. | |
| 4,975,064 A | 12/1990 | Takahashi et al. | |
| 4,978,191 A | 12/1990 | Hasegawa et al. | |
| 5,010,784 A * | 4/1991 | Nakazato et al. | 74/498 |
| 5,046,951 A | 9/1991 | Suzuki | |
| 5,100,331 A | 3/1992 | Banfelder | |
| 5,102,061 A | 4/1992 | Suzuki et al. | |
| 5,127,841 A | 7/1992 | Bannai et al. | |
| 5,139,436 A | 8/1992 | Bonn et al. | |
| 5,151,042 A | 9/1992 | Okada | |
| 5,171,153 A | 12/1992 | Kubota et al. | |
| 5,226,831 A | 7/1993 | Horiuchi | |
| 5,242,309 A | 9/1993 | Hasegawa | |
| 5,259,775 A | 11/1993 | Kubota et al. | |
| 5,286,219 A | 2/1994 | Ueno et al. | |
| 5,314,344 A | 5/1994 | Ida et al. | |
| 5,458,204 A * | 10/1995 | Tunkers | 173/49 |
| 5,561,266 A | 10/1996 | Okamoto et al. | |
| 5,586,381 A | 12/1996 | Schauer et al. | |
| 5,588,854 A | 12/1996 | Ikumi et al. | |
| 5,637,005 A * | 6/1997 | Bannai et al. | 439/164 |
| 5,643,002 A | 7/1997 | Wolf et al. | |
| 5,647,753 A | 7/1997 | Ishikawa et al. | |
| 5,653,604 A * | 8/1997 | Sakakibara | 439/164 |
| 5,655,919 A * | 8/1997 | Ishikawa et al. | 439/164 |
| 5,704,633 A | 1/1998 | Durrani et al. | |
| 5,928,018 A * | 7/1999 | Dumoulin | 439/164 |
| 5,971,781 A * | 10/1999 | Lagier | 439/164 |
| 5,988,018 A * | 11/1999 | Tolbert et al. | 81/9.4 |
| 6,019,621 A | 2/2000 | Sugata et al. | |
| 6,225,582 B1 | 5/2001 | Stadler et al. | |
| 6,236,004 B1 | 5/2001 | Stadler et al. | |
| 6,254,058 B1 * | 7/2001 | Keller | 251/69 |
| 6,325,657 B1 | 12/2001 | Schroer | |
| 6,419,043 B1 | 7/2002 | Duval et al. | |
| 6,547,689 B2 * | 4/2003 | Baker, Jr. | 475/331 |
| 6,548,003 B1 | 4/2003 | Rudolph et al. | |
| 6,617,534 B2 | 9/2003 | Goff et al. | |

* cited by examiner

NON-REVERSING SHORT TAPE COIL DEVICE

FIELD OF THE INVENTION

The invention relates to an electrical connection between two parts rotatable relative to one another.

BACKGROUND OF THE INVENTION

An electrical connection can be required between two parts that rotate relative to one another. For example, in a steering column for a vehicle, a supplemental inflatable restraint or "SIR" coil is a continuous or permanent electrical conductive path between the bottom of the steering column and the steering wheel. A signal to inflate the SIR is communicated along the path. The prior art of SIR coils includes at least two different designs. In a first design, called a "clock spring," approximately seven to eight meters of wire are wrapped around the steering column. The wire is arranged to tighten or loosen as the steering wheel is rotated. One of the main problems associated with this type of design is that the driver can feel the tension generated by the clock spring when turning in one direction. The second design is called a reversing design. A reversing design is approximately 700 millimeters long. Essentially, a single continuous tape is wrapped and unwrapped around the steering column. For example, the tape forms an inner ring and an outer ring connected by a loop. When the steering wheel is turned in one direction, the inner ring becomes longer and the outer ring becomes shorter, the position of the loop moving along a circular path defined by the steering column. When the steering column is turned in the other direction, the outer ring becomes longer and the inner ring becomes shorter. The fact that this design requires the loop portion also makes it necessary to use extremely small copper traces within the tape. These traces are difficult to manufacture and assemble. Another complication with using small copper traces is that a buss bar is required. The buss bar is connected to the traces and provides a more robust electrical connection. A terminal is crimped on the buss bar and external wires are connected to the terminal.

SUMMARY OF THE INVENTION AND ADVANTAGES

The invention provides an apparatus, or coil device, including a housing and a spool disposed in the housing for rotation. The apparatus also includes a wire disposed in the housing and having a first end fixedly engaged with the housing and a second end fixedly engaged with the spool. The wire is moveable between a first configuration generally wound around the spool and a second configuration generally unwound with respect to the spool and arranged along an inner surface of the housing. The wire moves between the first and second configurations in response to relative rotation between the spool and the housing. The apparatus also includes at least one guide member disposed in the housing and movable along an arcuate path. The guide member moves in an opposite direction of rotation of the spool to guide movement of the wire between the spool and the housing.

The present invention allows for a larger wire size in combination with a shorter length of wire. The wire can be sufficiently large to be directly connected to other wires without a buss bar. Another advantage of the present invention is that the present invention can be used with newer forms of tape. In particular, an extruded version of tape will not work in the prior art designs because the copper trace size is too large. These advantages will result in cost savings in material, manufacture and assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
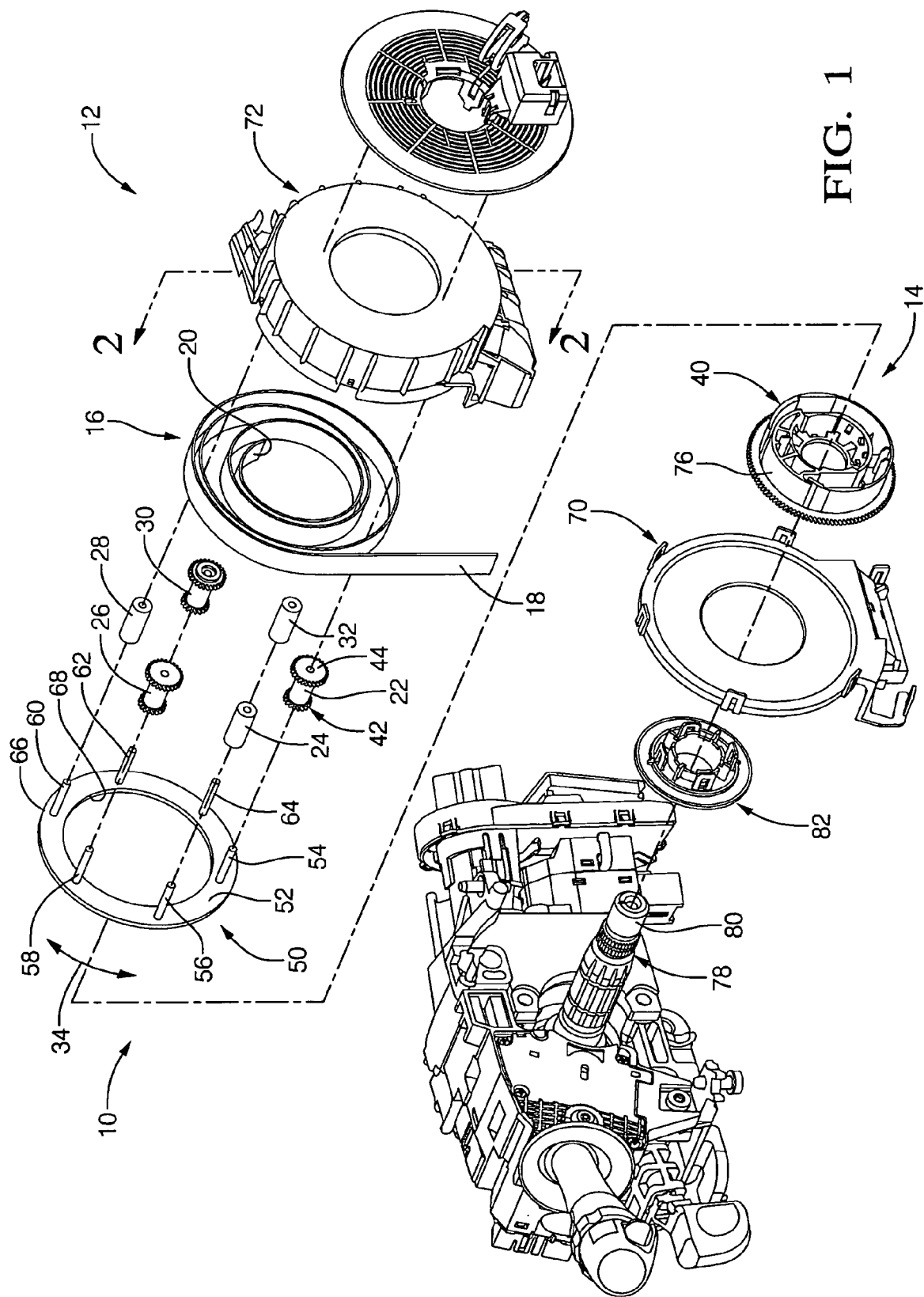
FIG. 1 is an exploded view of the an exemplary embodiment of the invention in combination with a steering column for a vehicle.

An apparatus or coil device 10 includes a housing 12. The apparatus 10 also includes a spool or rotor 14 disposed in the housing 12 for rotation. The spool 14 rotates in the housing 12. The apparatus 10 also includes a wire 16 disposed in the housing 12. The wire 16 has first end or portion 18 fixedly engaged with the housing 12 and a second end or portion 20 fixedly engaged with the spool 14. In alternative embodiments of the invention, the wire 16 can extend beyond one or both of the spool 14 and the housing 12. The apparatus 10 also includes at least one guide member 22, 24, 26, 28, 30, 32 disposed in the housing 12. The at least one guide member 22, 24, 26, 28, 30, 32 moves along an arcuate path 34 in an opposite direction of rotation of the spool 14 to guide movement of the wire 16 between the spool 14 and the housing 12.

The wire 16 extends along a spiral path around the spool 14 between the first and second ends 18, 20. The wire 16 is moveable between a first configuration generally unwound with respect to the spool 14 and arranged along an inner surface 74 of the housing 12 and a second configuration generally wound around the spool 14. The wire 16 moves between the first and second configurations in response to relative rotation between the spool 14 and the housing 12. In the exemplary embodiment of the invention, the apparatus 10 is associated with a steering column of a vehicle.

The at least one guide member 22, 24, 26, 28, 30, 32 is driven along an arcuate path 34 in a first angular direction 36 in response to rotation of the spool 14 in a second angular direction 38 opposite of the first angular direction 36. For example, the spool 14 defines a first set of teeth 40 and the housing defines a fourth set of teeth 46. The guide member 22 includes a radially inward side 48 engaging both the spool 14 and the housing 12. The at least one guide member 22 defines a second set of teeth 42 disposed in meshing engagement with the first set of teeth 40 and a third set of teeth 44 spaced from the second set of teeth 42 and disposed in meshing engagement with the fourth set of teeth 46. When the spool 14 rotates in the second angular direction 38, the cooperation between the gear teeth 40 and 42 as well as the cooperation between the gear teeth 44 and 46 urge the guide member 22 in the first angular direction 36. The guide members 26 and 30 are structured similarly with respect to the guide member 22, each defining spaced sets of teeth at opposite ends. In alternative embodiments of the invention the guide members 22, 26, 30 could engage the spool 14 and housing 12 without teeth.

The guide members 24, 28, 32 are also driven along the arcuate path 34 in the first angular direction 36 in response to rotation of the spool 14 in the second angular direction 38 opposite of the first angular direction 36. In the exemplary embodiment of the invention, the guide members 24, 28, 32 do not engage the spool 14 or the housing and each has a substantially smooth outer surface. The guide members 22, 26, 30 are rotatably supported on posts 54, 58, 62 of a support member 50. The support member 50 includes a ring 52 axially aligned with the spool 14. The posts 54, 58, 62 are cantilevered from the ring 52. The support member also includes posts 56, 60, 64 cantilevered from the ring 52. The posts 56, 60, 64 rotatably support guide members 24, 28, 32. The guide members 22, 26, 30 are driven by the cooperation of the sets of gear teeth, such as teeth 40, 42, 44, 46, and drive the posts 54, 58, 62. The ring 52 and posts 56, 60, 64 are also driven in rotation along the arcuate path 34.

In the exemplary embodiment of the invention, the guide members 22, 24, 26, 28, 30, 32 are evenly spaced about the ring 52 and the spool 14. The guide members 22, 26, 30 are disposed further radially inward than the guide members 24, 28, 32 to engage the spool 14 and the housing 12. The ring 52 defines an outer edge 66 and an inner edge 68 and the guide members 22, 26, 30 are supported on a first set of posts 54, 58, 62 disposed closer to the inner edge 68. The guide members 24, 28, 32 are supported on a second set of posts 56, 60, 64 disposed closer to the outer edge 66. The radially spacing of the posts 54, 58, 62 and 56, 60, 64 enhances the guiding of the wire 16. For example, the guide members 24, 28, 30 are disposed to guide or urge the wire 16 spirally outward against the surface 74 of the housing 12. In the first configuration, the wire 16 is substantially fully arranged between the guide members 24, 28, 32 and the radially inwardly facing surface 74. The guide members 22, 26, 30 are disposed to guide or urge the wire 16 against an annular perimeter 76 of the spool 14. In the second configuration, the wire 16 is substantially fully arranged between the first set of guide members 22, 26, 30 and the spool 14. In the exemplary embodiment, the wire 16 extends along the spiral path between the first and second ends 18, 20, extending between only one of a first set of guide members 22, 26, 30 and only one of second set of guide members 24, 28, 32.

Figure 2:
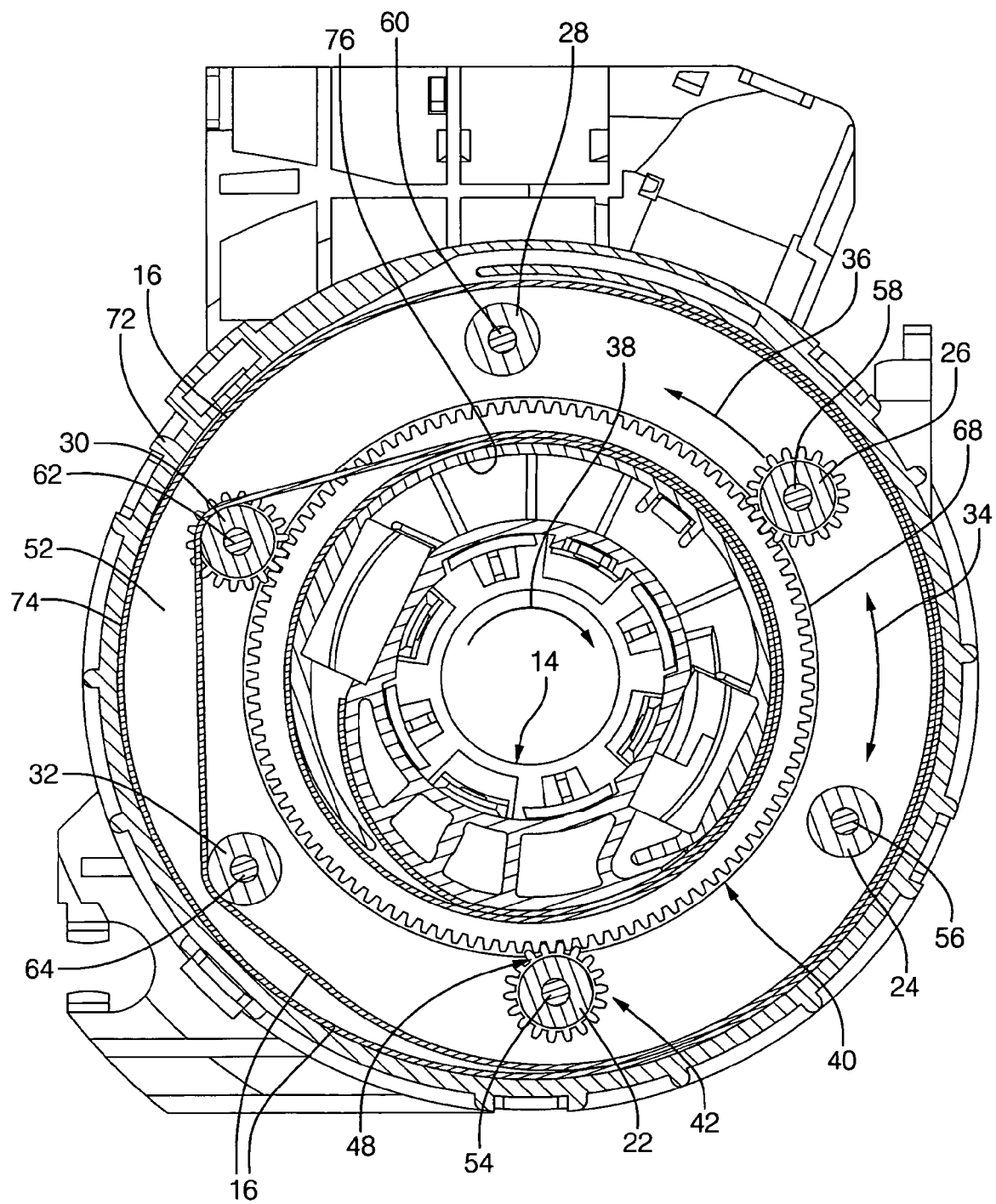
FIG. 2 is a partial cross-section taken generally along section lines 2—2 in FIG. 1.
Figure 3:
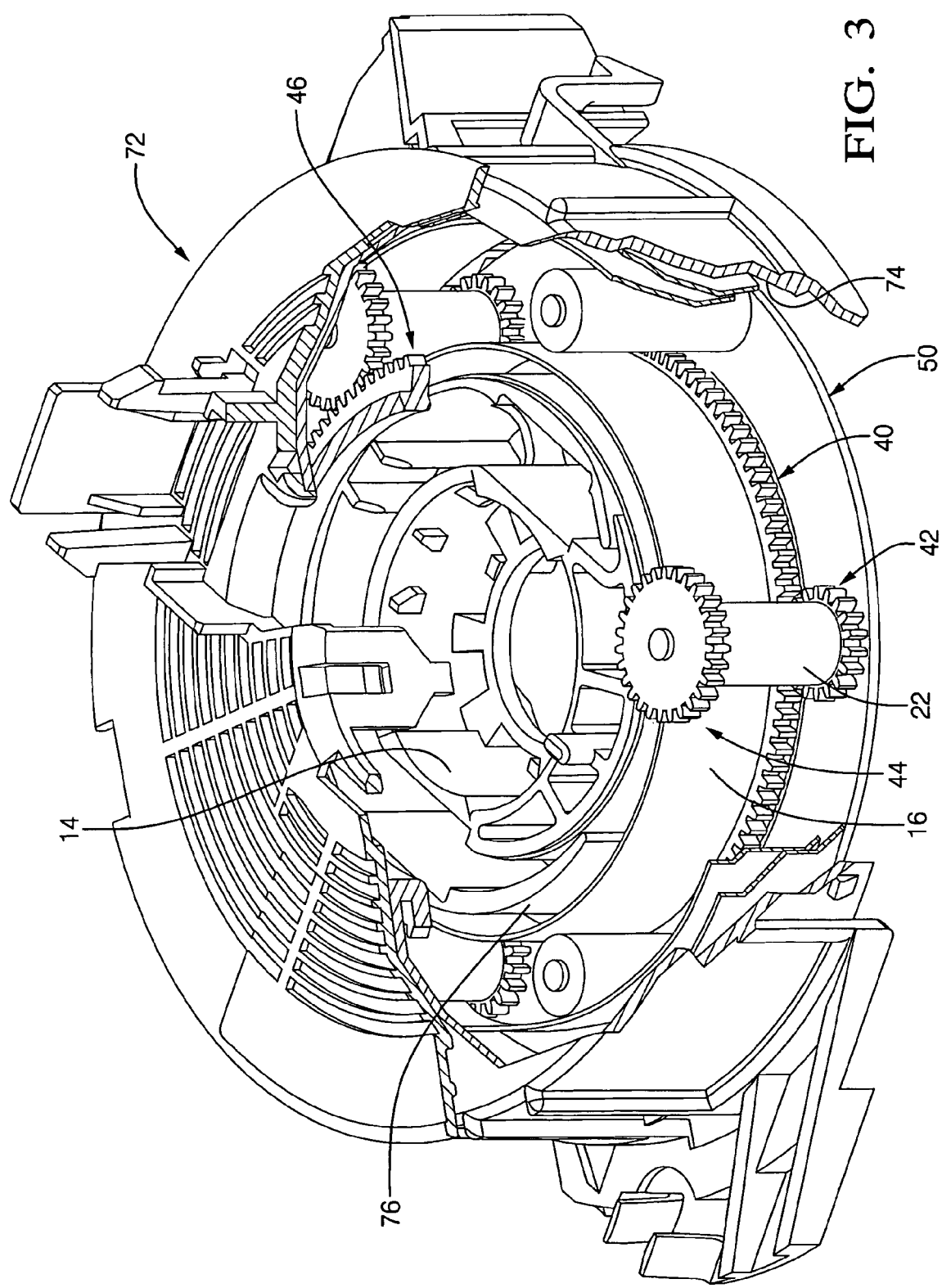
FIG. 3 is a cut-away perspective view of the exemplary embodiment of the invention.

The wire 16 defines a length between the first and second ends 18, 20. The length of the wire 16 can be less than the annular perimeter 76 of the spool 14 multiplied by twenty. Also, the spool 14 is rotatable a predetermined number of 360° rotations and the length of the wire 16 can be substantially equal to the annular perimeter 76 multiplied by the predetermined number of 360° rotations. For example, in the exemplary steering column embodiment, the wire 16 could be a "short-tape" design. A short tape design is preferable to reduce material costs. However, the wire 16 can be both a short tape as well as non-reversing, as best shown in FIG. 2. The wire 16 can be extruded, larger than copper traces in well known reversing, short tape structures.

In the exemplary embodiment of the invention, a locking device 82 locks the spool 14 with respect to a steering shaft 78. The housing 12 includes a plate 70 and a cover 72 releasably engageable with one another. A portion of the locking device 82 extends through an aperture in the plate 70. The spool 14 rotates with the steering shaft 78. The steering shaft 78 defines a steering wheel supporting portion 80 for engaging a steering wheel of a vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    a housing presenting an interior peripheral wall surrounding an axis and having a plurality of housing teeth surrounding said axis and spaced from said interior peripheral wall;
    a spool disposed in said housing for rotation and presenting a plurality of spool teeth surrounding said axis and spaced from said housing teeth along said axis;
    a wire disposed in said housing and at least partially abutting said interior peripheral wall having a first end fixedly engaged with said housing and a second end fixedly engaged with said spool; and
    at least one guide member disposed in said housing and movable along an arcuate path extending around said spool in a direction opposite of a direction of rotation of said spool to guide movement of said wire between said spool and said housing with said at least one guide member presenting a first end disposed in meshing engagement with said housing teeth and a second end disposed in meshing engagement with said spool teeth for rotating about said housing and said spool.

2. The apparatus of claim 1 wherein said at least one guide member is driven along said arcuate path in a first angular direction in response to rotation of said spool in a second angular direction opposite of said first angular direction.

3. The apparatus of claim 1 wherein:
    said first end of said at least one guide member defines a first set of teeth disposed in meshing engagement with said housing teeth and a second set of teeth defined at said second end of said at least one guide member spaced from said first set of teeth and disposed in meshing engagement with said spool teeth;
    with said wire disposed between said first set of teeth and said second set of teeth.

4. The apparatus of claim 1 wherein said at least one guide member includes a radially inward side, said at least one guide member engaging both of said spool and said housing along said radially inward side.

5. The apparatus of claim 1 wherein said wire is further defined as being extruded and non-reversing.

6. The apparatus of claim 1 wherein said wire is further defined as extending out of said housing.

7. The apparatus of claim 1 wherein said wire extends along a non-reversing spiral path between said first and second ends.

8. The apparatus of claim 1 further comprising:
    a support member having a ring axially aligned with said spool and at least one post cantilevered from said ring, said at least one guide member being rotatably supported by said at least one post.

9. The apparatus of claim 8 wherein said at least one post further comprises:
    a plurality of posts cantilevered from said ring.

10. The apparatus of claim 1 wherein said wire is non-reversing and defines a length and said spool defines an annular perimeter, said length being less than said annular perimeter multiplied by twenty.

11. The apparatus of claim 10 wherein said spool is further defined as being rotatable a predetermined number of 360° rotations and said length being substantially equal to said annular perimeter multiplied by said predetermined number of 360° rotations.

12. The apparatus of claim 9 wherein said at least one guide member further comprises:
a plurality of guide members individually supported by one of said plurality of posts for movement along said arcuate path.

13. The apparatus of claim 12 wherein said plurality of posts are evenly spaced around said ring.

14. The apparatus of claim 12 wherein said ring includes an outer edge and an inner edge and wherein said plurality of posts include a first set of posts disposed closer to said inner edge and a second set of posts disposed closer to said outer edge.

15. The apparatus of claim 12 wherein said plurality of guide members includes a first set of guide members each having an outer surface defining said first and second sets of teeth and a second set of guide members each having a substantially smooth outer surface.

16. The apparatus of claim 15 wherein said housing further comprises:
a plate; and
a cover releasibly engageable with said plate and having a top integral with and surrounded by said interior peripheral wall of the cover said top presenting a U-shaped lip surrounding said axis and terminating to said housing teeth spaced from and extending generally parallel to said top of said cover.

17. An apparatus comprising:
a rotatable steering shaft having a steering wheel engaging portion;
a housing having a interior peripheral wall encircling said steering shaft and having a plurality of housing teeth spaced from said interior peripheral wall and surrounding said steering shaft;
a spool disposed in said housing for rotation with said steering shaft with said spool presenting a plurality of spool teeth surrounding said steering shaft and spaced from said housing teeth along said steering shaft;
an extruded wire disposed in said housing and having a first terminal end fixedly engaged with said housing and a second terminal end fixedly engaged with said spool with said extruded wire extending along a non-reversing spiral path between said first and second terminal ends; and
at least one guide member disposed in said housing and movable along an arcuate path extending around said spool in a direction opposite of a direction of rotation of said spool to guide movement of said wire between said spool and said housing with said at least one guide member presenting a first end disposed in meshing engagement with said housing teeth and a second end spaced from said first end and disposed in meshing engagement with said spool teeth.

18. The apparatus of claim 17 further comprising:
a support member encircling said steering shaft and having a ring with an outer edge and an inner edge and a first set of posts cantilevered from said ring and disposed closed to said inner edge than said outer edge and also having a second set of posts cantilevered from said ring and disposed closed to said outer edge than said inner edge.

19. The apparatus of claim 18 wherein said at least one guide member further comprises:
a first set of guide members each having an outer surface, said first end having a first plate with a plurality of teeth surrounding and extending from said first plate and said second end having a second plate with a plurality of teeth surrounding and extending from said second plate and rotatably supported on one of said first set of posts; and
a second set of guide members each having a substantially smooth outer surface and rotatably supported on one of said second set of posts.

20. The apparatus of claim 19 wherein said housing defines a radially inwardly facing surface, said extruded wire being moveable from a first configuration substantially fully arranged between said second set of guide members and said radially inwardly facing surface, and a second configuration substantially fully arranged between said first set of guide members and said spool.

21. The apparatus of claim 20 wherein said extruded wire extends along a spiral path between said first and second ends, extending between only one of said first set of guide members and only one of second set of guide members.

22. The apparatus of claim 21 wherein said extruded wire is non-reversing.

* * * * *